United States Patent
Choi et al.

(10) Patent No.: US 7,585,584 B2
(45) Date of Patent: Sep. 8, 2009

(54) CARBON NANOTUBES FOR FUEL CELLS, METHOD FOR MANUFACTURING THE SAME, AND FUEL CELL USING THE SAME

(75) Inventors: Won-bong Choi, Kyungki-do (KR); Jae-uk Chu, Kyungki-do (KR); Chan-ho Pak, Seoul (KR); Hyuk Chang, Kyungki-do (KR)

(73) Assignee: Samsung SDI Co., Ltd., Suwon, Kyungki-Do (KR)

( * ) Notice: Subject to any disclaimer, the term of this patent is extended or adjusted under 35 U.S.C. 154(b) by 456 days.

(21) Appl. No.: 10/601,872

(22) Filed: Jun. 24, 2003

(65) Prior Publication Data

US 2004/0018416 A1    Jan. 29, 2004

(30) Foreign Application Priority Data

Jul. 29, 2002    (KR) ............................. 2002-0044631

(51) Int. Cl.
*H01M 4/00*    (2006.01)
(52) U.S. Cl. ........................ 429/40; 977/700; 977/701; 977/720
(58) Field of Classification Search ................... 429/27, 429/40, 42
See application file for complete search history.

(56) References Cited

U.S. PATENT DOCUMENTS 6,596,187 B2 *    7/2003    Coll et al. ..................... 216/56
6,887,451 B2 *    5/2005    Dodelet et al. ........... 423/447.3

(Continued)

FOREIGN PATENT DOCUMENTS

JP    10223233    8/1998

(Continued)

OTHER PUBLICATIONS

Bo Gan et al., "Branching Carbon Nanotubes Deposited in HFCVD System", Diamond and Related Materials 9 (2000) pp. 897-900, Elsevier Science S.A.

(Continued)

*Primary Examiner*—Patrick Ryan
*Assistant Examiner*—Cynthia Lee
(74) *Attorney, Agent, or Firm*—Buchanan Ingersoll & Rooney PC (57) ABSTRACT

Carbon nanotubes for use in a fuel cell, a method for fabricating the same, and a fuel cell using the carbon nanotubes for its electrode are provided. The internal and external walls of the carbon nanotubes are doped with nano-sized metallic catalyst particles uniformly to a degree of 0.3-5 mg/cm$^2$. The carbon nanotubes are grown over a carbon substrate using chemical vapor deposition or plasma enhanced chemical vapor deposition. Since the carbon nanotubes have a large specific surface area, and metallic catalyst particles are uniformly distributed over the internal and external walls thereof, the reaction efficiency in an electrode becomes maximal when the carbon nanotubes are used for the electrode of a fuel cell. The carbon nanotubes fabricated using the method can be applied to form a large electrode. The carbon nanotubes grown over the carbon substrate can be readily applied to an electrode of a fuel cell, providing economical advantages and simplifying the overall electrode manufacturing process. A fuel cell using as the carbon nanotubes for its electrode provides improved performance.

10 Claims, 5 Drawing Sheets

U.S. PATENT DOCUMENTS

| | | | |
|---|---|---|---|
| 7,157,068 B2 * | 1/2007 | Li et al. | 423/447.3 |
| 2001/0036523 A1 | 11/2001 | Sobolewski | |
| 2002/0068213 A1 * | 6/2002 | Kaiser et al. | 429/40 |
| 2004/0167014 A1 * | 8/2004 | Yan et al. | 502/101 |

FOREIGN PATENT DOCUMENTS

| | | |
|---|---|---|
| JP | 2000-063112 | 2/2000 |
| JP | 2000-243411 | 9/2000 |
| JP | 2002298861 | 10/2002 |
| JP | 2003201108 | 7/2003 |
| WO | WO 01/85612 A2 | 11/2001 |
| WO | WO 01/85612 A3 | 11/2001 |

OTHER PUBLICATIONS

O. Smiljanic et al., "Growth of Carbon Nanotubes on Ohmically Heated Carbon Paper", Chemical Physics Letters, vol. 342, Nos. 5 & 6, Jul. 20, 2001, pp. 503-509.

Z.F. Ren, "An Insight Into Carbon Nanotube Production", Sample Journal, Sep./Oct. 2001, vol. 37, No. 5, pp. 64-67.

Japanese Patent Office Action dated Aug. 3, 2004 with English translation.

* cited by examiner

CARBON NANOTUBES FOR FUEL CELLS, METHOD FOR MANUFACTURING THE SAME, AND FUEL CELL USING THE SAME

BACKGROUND OF THE INVENTION

This application claims priority from Korean Patent Application No. 2002-44631, filed on Jul. 29, 2002, in the Korean Intellectual Property Office, the disclosure of which is incorporated herein in its entirety by reference.

1. Field of the Invention

The present invention relates to carbon nanotubes, and more particularly, to carbon nanotubes for fuel cells, which are directly grown over a carbon substrate and whose internal and external walls are uniformly doped with metallic catalyst particles, and a method for fabricating the carbon nanotubes, and a fuel cell using the carbon nanotubes for an electrode.

2. Description of the Related Art

Recently, with growing concerns about the environment and the exhaustion of energy resources, and the commercialization of fuel cell automobiles, there is an urgent need for the development of reliable, high-performance fuel cells that are operatable at an ambient temperature with high energy efficiency and for the development of polymer membranes capable of increasing the efficiency of fuel cells.

Fuel cells are new power generating systems that convert energy produced through the electrochemical reactions of fuel and oxidative gas directly into electric energy. Such fuel cells can be categorized into fuel cells with molten carbonate salt, which are operable at a high temperature of 500-700° C., fuel cells with phosphoric acid, which are operable around 200° C., alkaline electrolyte fuel cells operable between room temperature and 100° C., and solid polymer electrolyte (SPE) fuel cells operable at a temperature of ambient ~100° C.

SPE fuel cells include proton-exchange membrane fuel cells (PEMFCs) using hydrogen gas as a fuel source and direct methanol fuel cells (DMFCs) which generate power using liquid methanol solution directly applied to the anode as a fuel source.

SPE fuel cells, which are emerging as the next generation of a clean energy source alternative to fossil fuels, have high power density and high-energy conversion efficiency. In addition, SPE fuel cells are workable at an ambient temperature and are easy to hermetically seal and miniaturize, so they can be extensively applied to the fields of pollution-free vehicles, power generating systems for house use, mobile telecommunications equipment, medical equipment, military equipment, equipment in space, and the like.

Figure 1:
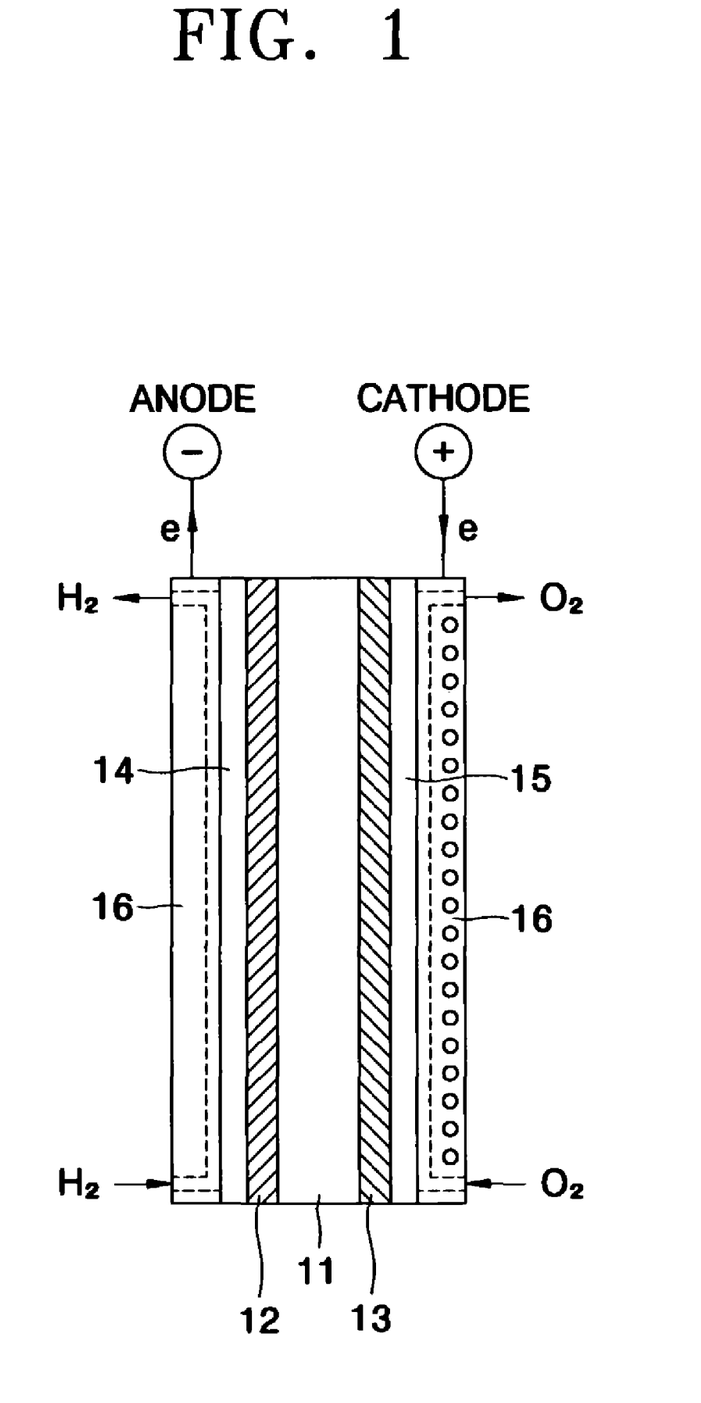
FIG. 1 shows the configuration of a fuel cell.

The basic structure of a PEMFC as a power generator producing a direct current through the electrochemical reaction of hydrogen and oxygen is shown in FIG. 1. Referring to FIG. 1, a PEMFC has a proton-exchange membrane 11 interposed between an anode and a cathode. The proton-exchange membrane 11 is formed of an SPE with a thickness of 50-200 μm. The anode and cathode includes anode and cathode backing layers 14 and 15, respectively, for supplying reaction gases or liquid, and catalyst layers 12 and 13, respectively, where oxidation/reduction of reaction occur, forming catalyst electrodes (hereinafter, the anode and cathode will be referred to as "catalyst electrodes"). In FIG. 1, reference numeral 16 denotes a carbon sheet having gas injection holes and acting as a current collector.

As hydrogen as a reaction gas is supplied to a PEMFC having the structure as described above, hydrogen molecules decompose into protons and electrons through oxidation reaction in the anode. These protons reach the cathode through the proton-exchange membrane 11. Meanwhile, in the cathode, oxygen molecules take electrons from the anode and are reduced to oxygen ions through reaction. These oxygen ions react with the protons from the anode to produce water.

As shown in FIG. 1, in the gas diffusion electrodes of the PEMFC, the catalyst layers 12 and 13 are formed on the anode and cathode backing layers 14 and 15, respectively. The anode and cathode backing layers 14 and 15 are formed of carbon cloth or carbon paper. The surfaces of the anode and cathode backing layers 14 and 15 are treated for reaction gases and water to easily permeate into the proton-exchange membrane 11 before and after reaction.

DMFCs have a similar structure to the PEMFC described above, but use liquid methanol solution instead of hydrogen as a fuel source. As methanol solution is supplied to the anode, an oxidation reaction occurs in the presence of a catalyst to generate protons, electrons, and carbon dioxide. Although DMFCs has lower energy efficiency than PEMFCs, the use of a liquid fuel in DMFCs makes their application to portable electronic devices easier.

Electrodes, fuel, electrolyte membranes for high energy density, high power fuel cells have been actively researched. In addition, there have been attempts to increase the activity of a catalyst used in the electrodes. Since the activity of catalysts is proportional to the reaction surface area thereof, it is necessary to increase the reaction surface area by reducing the diameter of catalyst particles to a few nanometers and to uniformly distribute such nano-sized catalyst particles over the electrodes.

Conventionally, catalysts such as platinum have been applied as paste, uniformly to electrode backing layers of porous carbon substrate. However, the dispersion of the catalyst in the electrode backing layers is not uniform, and the surface area of the carbon carrier and electrical conductivity are not large enough.

Japanese Laid-open Publication No. 2000-63112 discloses a method for manufacturing single-walled carbon nanotubes into which trace of metal is incorporated by $CO_2$ laser irradiation of a metal containing carbon source. In this method, the use of laser limits the area where carbon nanotubes are grown. To be applied to fuel cells, an additional step of coating electrodes with a paste of the carbon nanotubes is required, which makes the overall fuel cell manufacturing process complicated.

SUMMARY OF THE INVENTION

The present invention provides carbon nanotubes directly grown over a carbon substrate and whose internal and external walls are uniformly doped with catalyst particles of a diameter of a few nanometers or less.

The present invention also provides a method for fabricating the above carbon nanotubes grown over the carbon substrate.

The present invention also provides a fuel cell with improved efficiency, which is formed using the above carbon nanotubes grown over the carbon substrate for an electrode.

According to an aspect of the present invention, there is provided carbon nanotubes grown over a carbon substrate and whose internal and external walls are doped with nano-sized metallic catalyst particles uniformly to a degree of 0.3~5 mg/cm².

According to another aspect of the present invention, there is provided a method for fabricating carbon nanotubes grown over a carbon substrate, comprising: uniformly distributing metallic catalyst particles over the carbon substrate; and supplying a carbon source gas at a constant rate under atmospheric pressure and reacting the carbon source gas with the metallic catalyst particles at a temperature of 400-900° C. for 1-120 minutes to grow carbon nanotubes over the carbon substrate.

According to still another aspect of the present invention, there is provided a fuel cell using the above carbon nanotubes grown over a carbon substrate for an electrode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A feature of the present invention lies in that carbon nanotubes are directly grown over a carbon substrate. Accordingly, the carbon substrate over which the carbon nanotubes according to the present invention are grown can be readily applied to a fuel cell. Moreover, according to the present invention, rather than growing upright, carbon nanotubes branch off while growing over the carbon substrate, thereby increasing a reaction surface area thereof. The internal or external walls of the carbon nanotubes are uniformly doped with mono, binary, ternary or higher catalytic particles, preferably selected from the group consisting of Pt, Ru, Fe, and Co, having a diameter of a few nanometers. Therefore, when such carbon nanotubes according to the present invention are used in a fuel cell, the reaction efficiency in an electrode of the fuel call becomes maximal. Also, according to the present invention, as the carbon nanotubes grow, the metallic catalyst particles are evenly distributed along the internal and outer walls of the carbon nanotubes and fixed stably thereto so as not to be affected by an external force.

Figure 3:
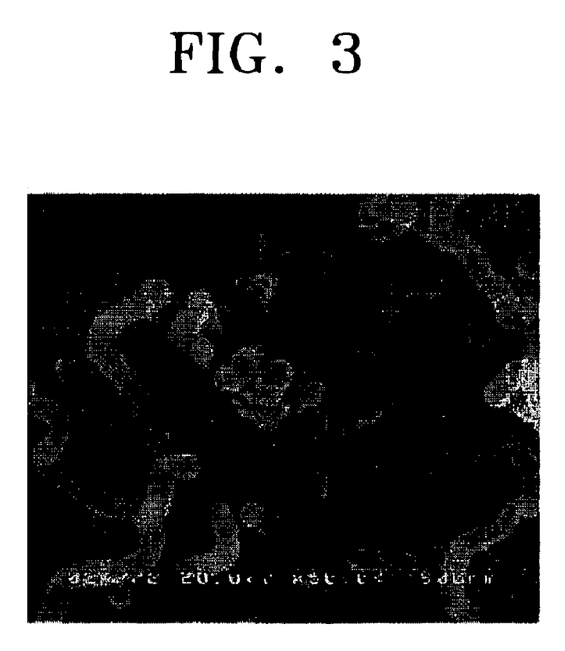
FIG. 3 is a SEM photograph of carbon nanotubes for use in fuel cells according to the present invention.

FIG. 3 is a scanning electron microscopic (SEM) photograph of carbon nanotubes according to the present invention. As is apparent in FIG. 3, the carbon nanotubes according to the present invention are grown branched, not upright, so that their surface area becomes large.

Figure 4:
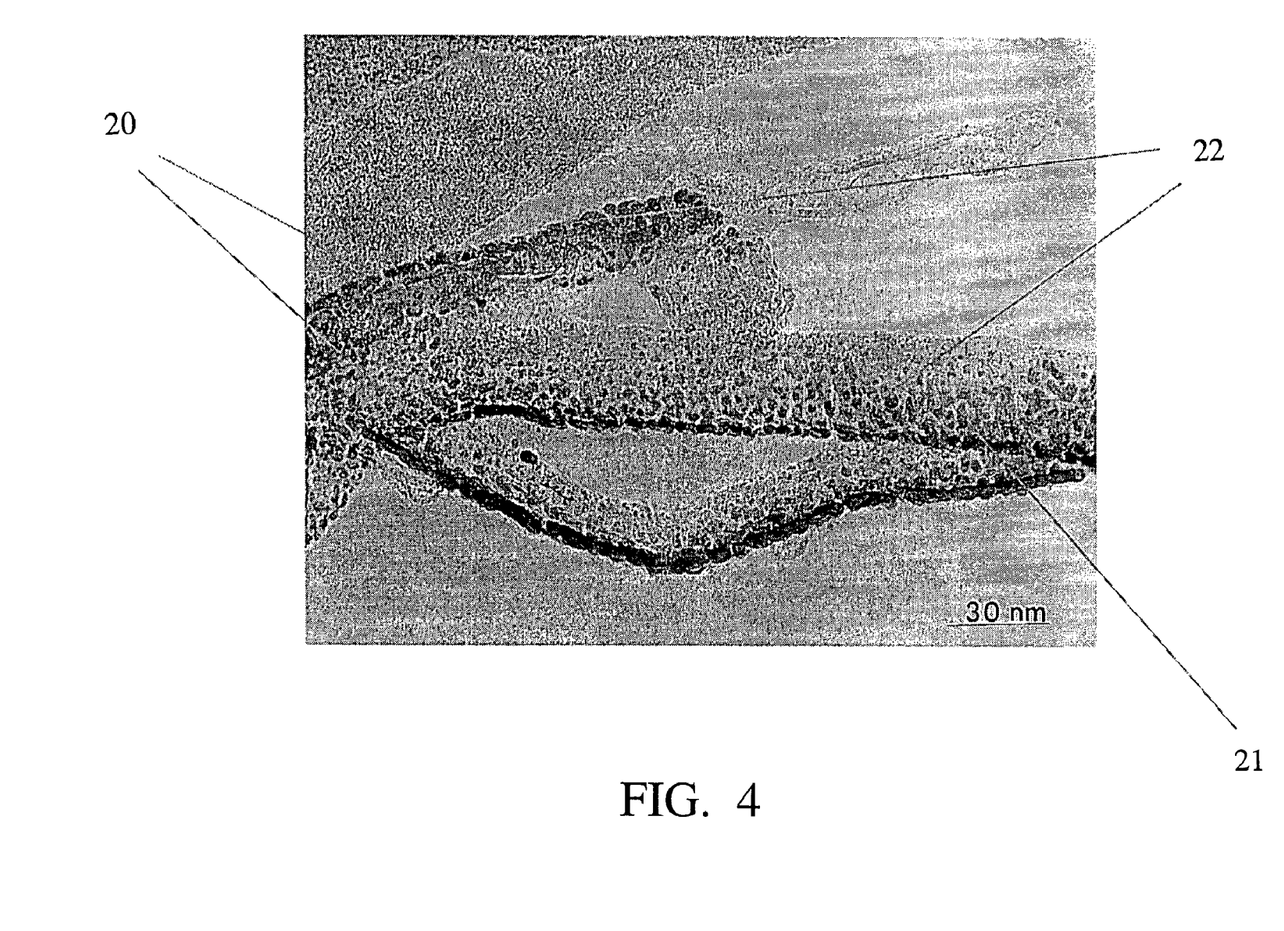
FIG. 4 is a transmission electron microscopic (TEM) photograph of a branched carbon nanotube for use in fuel cells according to the present invention.

As also illustrated in FIG. 4, branched carbon nanotubes 20 are illustrated branching off from a main carbon nanotube 21. It is noted that as illustrated in FIG. 4, dispersed catalytic metal particles 22 are uniformly distributed on the internal and external walls of the carbon nanotubes. As further mentioned below, the dispersed catalytic metal particles 22 are adsorbed onto the external (as illustrated in FIG. 4 as black dots) and absorbed into the internal wall (as illustrated in FIG. 4 as gray dots) on surfaces of both the main and branched carbon nanotubes.

FIG. 4 is a transmission electron microscopic (TEM) photograph of a branched carbon nanotube according to the present invention. In FIG. 4, numerous metallic catalyst particles are uniformly distributed on the internal and external walls of the carbon nanotube, wherein metallic catalyst particles adsorbed onto the external wall are illustrated as black dots, and metallic catalyst particles adsorbed onto the internal wall are illustrated as gray dots. According to the present invention, it is preferable that the degree of dispersion of the metallic catalyst particles be in the range of 0.3-5 mg/cm². If the metallic catalyst particles have a degree of dispersion of less than the lower limit, the reaction activity of the metallic catalyst particles is insufficient. If the metallic catalyst particles have a degree of dispersion of greater than the upper limit, they tend to lump together and inhibit carbon nanotube growth.

A method for fabricating carbon nanotubes for catalyst support according to certain embodiments of the present invention will be described step by step with reference to FIG. 6. In a method for fabricating carbon nanotubes according to certain embodiments of the present invention, after uniformly dispersing metallic catalyst particles over a carbon substrate, as illustrated in (a) of FIG. 6, carbon source gas is supplied at a constant rate under atmospheric pressure and reacted at 400-900° C. for 1-120 minutes to grow carbon nanotubes over the carbon substrate, as illustrated in (b) of FIG. 6. When the carbon nanotubes grow to some extent, as illustrated in (c) of FIG. 6, hydrogen gas or ammonia gas may be applied to fabricate branched carbon nanotubes, as illustrated in (d) of FIG. 6. While carbon nanotubes grow, most metallic catalyst particles adsorb onto the internal and external walls of the carbon nanotubes. However, some metallic catalyst particles may act as nuclei from which the carbon nanotubes branch off when subjected to etching using reducing gas, such as hydrogen gas or ammonia gas. Therefore, the branched carbon nanotubes according to certain embodiments of the present invention can be fabricated. In particular, hydrogen gas converts metallic catalyst particles in oxidized form into reduced form, thereby increasing the activity of the catalyst particles and leading to the growth of branched carbon nanotubes. Alternatively, branched carbon nanotubes may be fabricated by appropriately adjusting the flow rate of carbon source gas and reaction temperature and time such that metallic carbon nanotubes can migrate along the growing carbon nanotubes.

Figure 6:
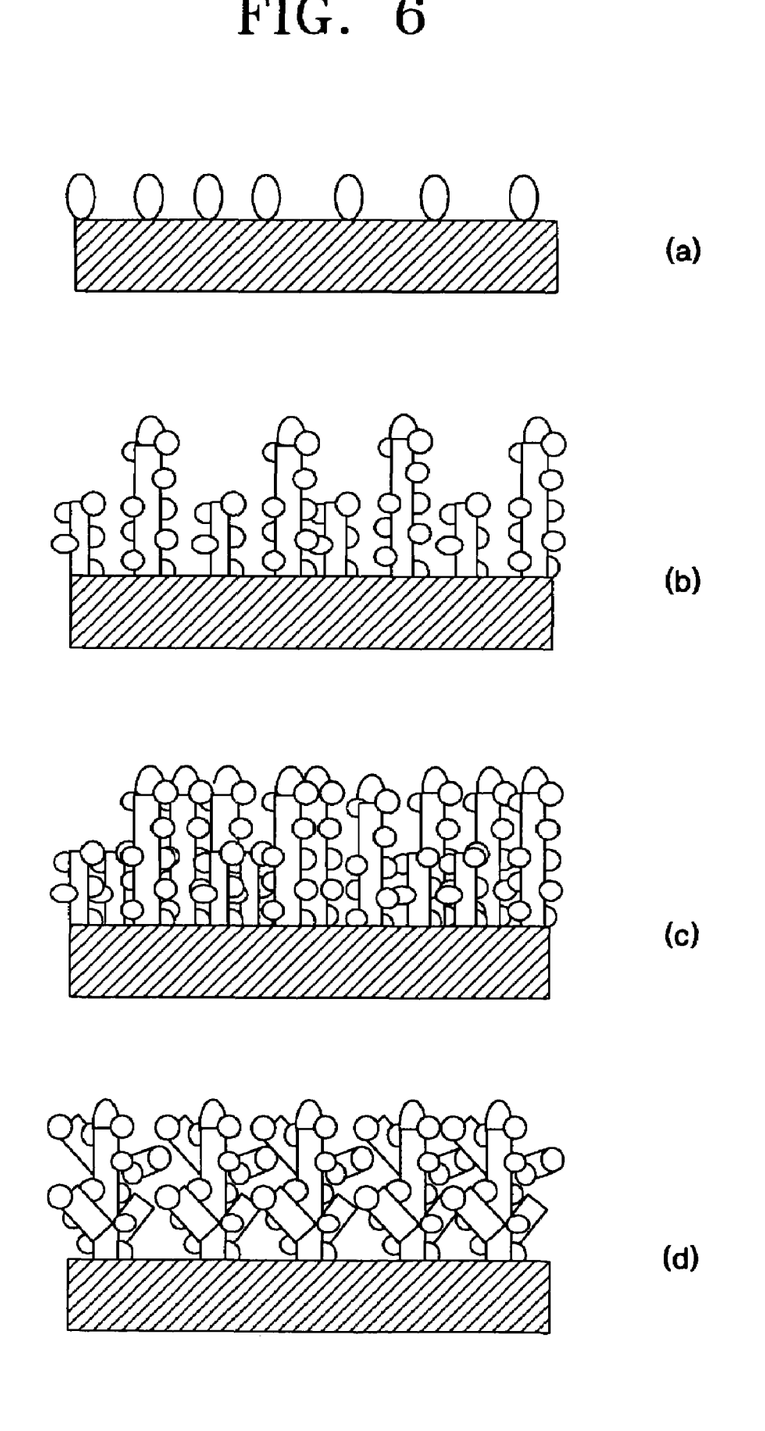
FIG. 6 illustrates, step by step, a method for fabricating carbon nanotubes according to the present invention, in which (a) illustrates uniformly distributing catalyst particles over a carbon substrate, (b) illustrates directly growing carbon nanotubes over the carbon substrate with the catalyst particles serving as seeds for the growth of the carbon nanotubes, (c) illustrates adjusting the density of growing carbon nanotubes, and (d) illustrates adjusting the growth of carbon nanotubes to form branched carbon nanotubes.

As illustrated in FIG. 6(d), the carbon nanotubes include a main axis region with a terminal portion on the top located on the main axis region opposite from the carbon substrate, wherein branches emanate or branch off from the main axis region between the substrate and the terminal portion. As also illustrated in FIG. 6(d), two branches, for example, can emanate from the main axis region, wherein the two branches can be symmetrical around the main axis. Additionally, the branches are illustrated as emanating from the main axis region without deviation in the main axis region. In other words, the branches do not emanate from turns or kinks in the main axis region.

In the method for fabricating carbon nanotubes for use in a fuel cell according to the present invention, uniformly dispersing the metallic catalyst particles over the carbon substrate may be achieved by electrophoresis, thermal spraying, sputtering, chemical vapor deposition (CVD), and any other techniques common to one of ordinary skill in the art.

Figure 5:
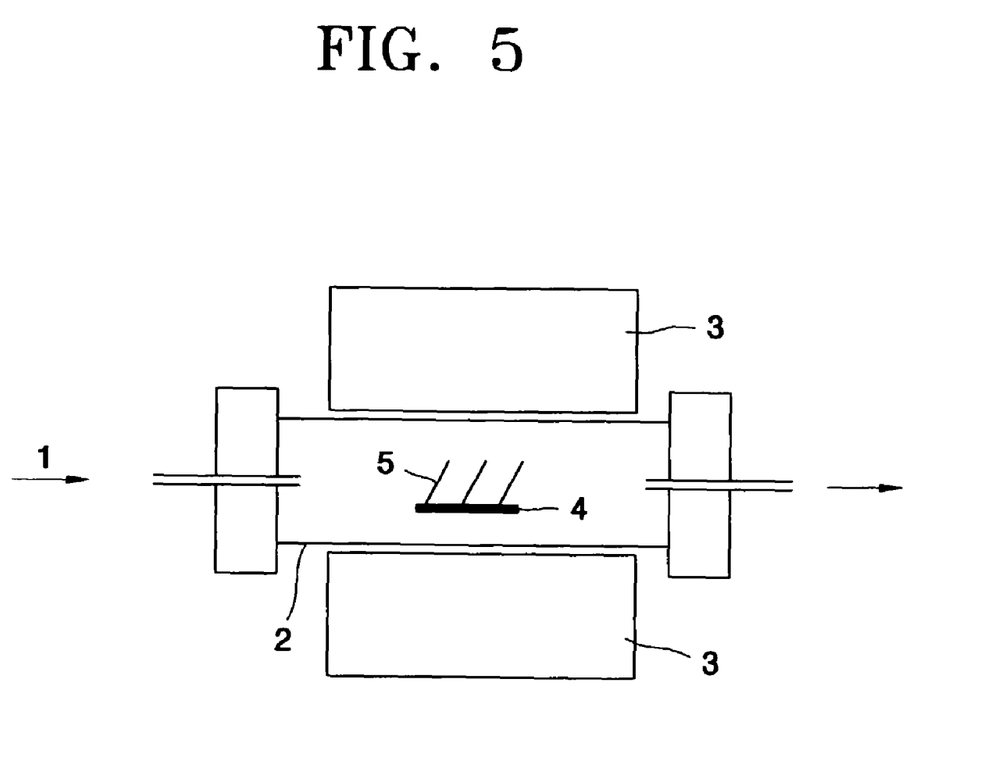
FIG. 5 shows a reaction system used in a method for fabricating carbon nanotubes according to the present invention.

FIG. 5 shows a reaction system used in a method for fabricating carbon nanotubes according to the present invention. A bare carbon substrate 4 is inserted into a slit of a quartz boat 5. The quartz boat 5 in which the bare carbon substrate 5 is mounted is placed at the center of a reactor 2. In FIG. 5, reference numeral 3 denotes a heating unit. After argon gas or nitrogen gas is supplied into the quartz tube under atmospheric pressure, carbon source gas is supplied at a constant rate under atmospheric pressure and reacted at 400-900° C. for 1-120 minutes to grow carbon nanotubes over the carbon substrate. Suitable carbon source gas that can be used in the present invention may be any gas commonly used by one of ordinary skill in the art, in which preferred carbon source gas includes ethylene, carbon monoxide, carbon dioxide, and methane. If the reaction temperature is less than 400° C., carbon particles, rather than nanotubes, result. If the reaction temperature is above 900° C., the activity of the metallic carbon particles is reduced, and the growth rate of carbon nanotubes greatly drops. It is preferable that the carbon source gas is supplied at a rate of 10-1000 sccm. If the flow rate of the carbon source gas is less than 10 sccm, the amount of carbon source gas is insufficient to grow carbon nanotubes. If the carbon source gas is supplied at a rate of 1000 sccm, undesirable carbon particles adhere to the grown carbon nanotubes because of the supply of excess carbon source gas.

As described above, according to the present invention, carbon nanotubes are grown over a carbon substrate. Such a carbon substrate may be carbon cloth or carbon paper. The carbon substrate over which the carbon nanotubes have been grown according to the present invention can be readily applied as an electrode of a fuel cell, thereby simplifying the overall process for manufacturing electrodes of fuel cells. In conventional electrode manufacturing processes, a paste of catalysts or a paste of catalysts and carbon nanotubes is applied to electrode backing layers, such as carbon cloth. In other words, conventional electrode manufacturing processes are complicated because they involve separate steps for processing electrode substrates, doping the electrode substrate with catalysts, and forming complete electrodes. However, according to the present invention, while carbon nanotubes are directly grown over a carbon substrate that can be used for an electrode, catalytic particles are uniformly distributed over the growing carbon nanotubes. As a result, the electrode manufacturing process is markedly simplified, thereby lowering the cost of products.

In a method for fabricating carbon nanotubes for use in fuel cells according to the present invention, plasma enhanced chemical vapor deposition (PECVD) instead of common CVD may be applied. In PECVD, while carbon source gas is supplied between two electrodes of a reactor where metallic catalysts are previously placed, microwaves or radio waves are applied to the reactor to activate the carbon source gas into a plasma state and to grow carbon nanotubes over the electrodes by the activated energy. "Plasma" collectively refers to gaseous ions generated when gaseous molecules are bombarded with high-energy free electrons generated by glow discharging and the free electrons.

Fuel cells can be classified into alkaline fuel cells, phosphoric acid fuel cells, molten carbonate salt fuel cells, solid oxide fuel cells, and solid polymer electrolyte (SPE) fuel cells according to the kinds of electrolytes. Alkaline fuel cells, phosphoric acid fuel cells, and SPE fuel cells require platinum catalysts. Branched carbon nanotubes directly grown over a carbon substrate according to the present invention can be applied as electrodes in alkaline fuel cells, phosphoric acid fuel cells and SPM fuel cells (PEMFC and DMFC).

The present invention will be described in greater detail with reference to the following examples. The following examples are for illustrative purposes and are not intended to limit the scope of the invention.

EXAMPLE 1

Figure 2:
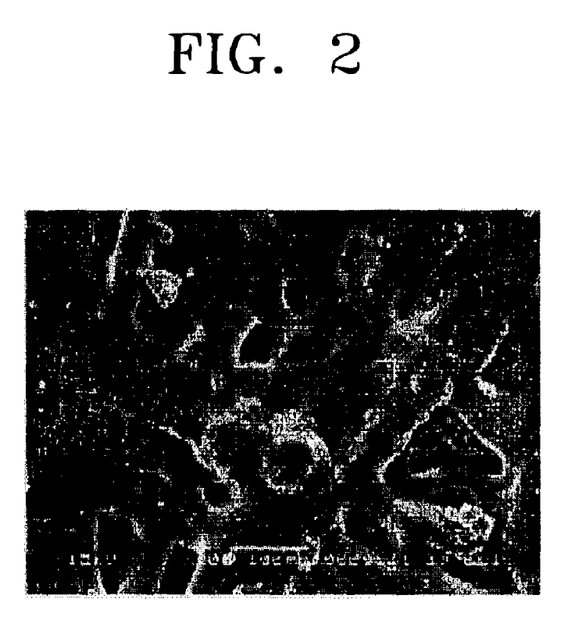
FIG. 2 is a scanning electron microscopic (SEM) photograph showing the uniform distribution of metallic carbon particles over a carbon substrate.

Platinum (Pt) as a metallic catalyst was dispersed over a water-proofed carbon paper serving as a carbon substrate for 1 minute by electrophoresis, and a uniform dispersion of the Pt particles was confirmed using scanning electron microscope (SEM)-energy dispersive spectroscopy (EDS). The result is shown in FIG. 2. The carbon substrate over which the Pt particles had been uniformly distributed was mounted in a quartz boat and placed at the center of a reactor. The reactor was purged with argon gas at 5000 sccm under atmospheric pressure while the temperature of the reactor was elevated to 500° C. When the temperature of the reactor reached 500° C., acetylene was supplied into the reactor as a carbon source gas at 10 sccm under atmospheric pressure for 60 minute to synthesize carbon nanotubes. Next, while argon gas was supplied into the reactor at 300 sccm under atmospheric pressure, the temperature of the carbon nanotubes were dropped to room temperature to provide carbon nanotubes doped with the Pt particles uniformly to a degree of 1 mg/cm$^2$.

EXAMPLE 2

Carbon nanotubes were synthesized in the same manner as in Example 1, except that $Fe_2O_3$ instead of Pt was used as the catalyst. As a result, carbon nanotubes doped with Fe particles uniformly to a degree of 2 mg/cm$^2$ were obtained.

EXAMPLE 3

Branched carbon nanotubes were synthesized in the same manner as in Example 1, except that, after 10 minutes from the supply of the carbon source gas to allow carbon nanotubes to grow to some extent, hydrogen gas was supplied into the reactor at 50 sccm for 20 minutes. As a result, branched carbon nanotubes doped with the catalyst particles uniformly to a degree of 2 mg/cm$^2$ were obtained.

As described above, carbon nanotubes whose internal and external walls are uniformly doped with metallic catalyst particles having a diameter of a few nanometers according to the present invention, which are directly grown over a carbon substrate, have a wide specific surface area, especially when the carbon nanotubes are branched off, so that the carbon nanotubes according to the present invention maximize the reaction efficiency in an electrode when used for the electrode of a fuel cell. In addition, since the carbon nanotubes are directly grown over a carbon substrate that can be used for an electrode, the carbon substrate with the carbon nanotubes grown thereover can be readily applied as an electrode of a fuel cell at low costs, without the need for complicated electrode manufacturing processes. Moreover, since mono, binary, ternary or higher metallic elements can be used as a catalyst, the carbon nanotubes grown over a carbon substrate according to the present invention can be used for cathodes as well as anodes. When branched carbon nanotubes are grown over a carbon substrate using CVD or PECVD in a method according to the present invention, the branched carbon nanotubes grown over the carbon substrate have a larger surface area, so that they can be used for more effective electrodes. A fuel cell using as an electrode a carbon substrate over which the carbon nanotubes according to the present invention are grown provides improved performance, compared to conventional fuel cells.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. Carbon nanotubes, which are directly grown over a carbon substrate, whose internal and external walls are uniformly doped with nano-sized metallic catalyst particles, wherein the carbon nanotubes include a main axis region with a terminal portion and a first portion, wherein the terminal portion is located on the main axis region opposite from the carbon substrate and the first portion is located between the terminal portion and the carbon substrate, and wherein two or more branches branch out symmetrically around the main axis from the first portions to form branched carbon nanotubes.

2. The carbon nanotubes of claim 1, wherein the metallic catalyst particles are derived from at least one selected from the group consisting of Pt, Ru, Fe, Co, and alloys or mixtures of the forgoing elements.

3. The carbon nanotubes of claim 1, wherein the carbon substrate is carbon cloth or carbon paper.

4. The carbon nanotubes of claim 1, wherein the catalyst is selected to act as both a catalyst for carbon nanotube growth and as a fuel cell catalyst.

5. A fuel cell using the carbon nanotubes grown over the carbon substrate according to claim 1 for an electrode.

6. A fuel cell using the carbon nanotubes grown over the carbon substrate according to claim 2 for an electrode.

7. A fuel cell using the carbon nanotubes grown over the carbon substrate according to claim 3 for an electrode.

8. A fuel cell using the carbon nanotubes grown over the carbon substrate according to claim 4 for an electrode.

9. The carbon nanotubes of claim 1, wherein the internal and external walls of the carbon nanotubes are uniformly doped with nano-sized metallic catalyst particles to a degree of $0.3$-$5$ mg/cm$^2$.

10. The carbon nanotubes of claim 1, wherein the one or more branches comprise at least three branches branching out from the first portion of the carbon nanotubes.

* * * * *